US012224525B2

(12) United States Patent
Zhu et al.

(10) Patent No.: US 12,224,525 B2
(45) Date of Patent: Feb. 11, 2025

(54) CONNECTOR AND CONNECTOR ASSEMBLY

(71) Applicants: TYCO Electronics Technology (SIP) Ltd., Suzhou (CN); Tyco Electronics (Suzhou) Ltd., Suzhou (CN); Tyco Electronics (Shanghai) Co., Ltd., Shanghai (CN)

(72) Inventors: Jianghua Zhu, Suzhou (CN); Jun Zong, Shanghai (CN); Siqi Chen, Shanghai (CN)

(73) Assignees: TYCO Electronics Technology (SIP) Ltd., Suzhou (CN); Tyco Electronics (Suzhou) Ltd., Suzhou (CN); Tyco Electronics (Shanghai) Co., Ltd., Shanghai (CN)

( * ) Notice: Subject to any disclaimer, the term of this patent is extended or adjusted under 35 U.S.C. 154(b) by 434 days.

(21) Appl. No.: 17/726,570

(22) Filed: Apr. 22, 2022

(65) Prior Publication Data

US 2022/0344867 A1 Oct. 27, 2022

(30) Foreign Application Priority Data

Apr. 27, 2021 (CN) ......................... 202120883361.0

(51) Int. Cl.

| | |
|---|---|
| ***H01R 13/627*** | (2006.01) |
| ***H01R 13/436*** | (2006.01) |
| ***H01R 13/639*** | (2006.01) |
| ***H01R 13/64*** | (2006.01) |

(52) U.S. Cl.

CPC ..... *H01R 13/6273* (2013.01); *H01R 13/4362* (2013.01); *H01R 13/639* (2013.01); *H01R 13/64* (2013.01)

(58) Field of Classification Search

CPC ............ H01R 13/6273; H01R 13/4362; H01R 13/639; H01R 13/64; H01R 13/6272; H01R 13/641

See application file for complete search history.

(56) References Cited

U.S. PATENT DOCUMENTS

| | | | | | |
|---|---|---|---|---|---|
| 5,273,445 | A * | 12/1993 | Ehrenfels | H01R 13/60 | 439/680 |
| 5,507,656 | A * | 4/1996 | Ales | H01R 13/60 | 439/133 |
| 5,944,550 | A * | 8/1999 | Vindigni | H01R 13/6397 | 439/333 |
| 9,929,508 | B2 * | 3/2018 | Puhl | H01R 13/6666 | |

* cited by examiner

*Primary Examiner* — Briggitte R. Hammond

(74) *Attorney, Agent, or Firm* — Potomac Law Group, PLLC

(57) ABSTRACT

A connector and a connector assembly are disclosed. The connector assembly can have: a first connector having a first housing on which a first latch device is formed; and a second connector having a second housing on which a first latch slot and a padlock hole are formed. When the first connector and the second connector are assembled to a pre lock position, the first latch device is locked into the first latch slot and blocked by a padlock locked into the padlock hole to prevent the first connector and the second connector from being further assembled to a final lock position. Therefore, the present invention can reliably prevent the first connector and the second connector from being accidentally matched together and improve the safety.

15 Claims, 9 Drawing Sheets

CONNECTOR AND CONNECTOR ASSEMBLY

CROSS-REFERENCE TO RELATED APPLICATION

This application claims the benefit of Chinese Patent Application No. CN202120883361.0 filed on Apr. 27, 2021 in the State Intellectual Property Office of China, the whole disclosure of which is incorporated herein by reference.

BACKGROUND OF THE INVENTION

Field of the Invention

The present invention relates to a connector and a connector assembly comprising the connector.

Description of the Related Art

In the prior art, the high-voltage interlock connector usually includes a male connector and a female connector suitable for mating with each other. For the sake of safety, it is hoped that the male and female connectors cannot be accidentally matched together, because once the male and female connectors are accidentally matched together, it will lead to high-voltage power on, which is very dangerous and easy to cause safety accidents. For example, when workers are repairing an electric device, accidental mating will cause danger such as electric shock to workers.

SUMMARY OF THE INVENTION

The present invention has been made to overcome or alleviate at least one aspect of the above mentioned disadvantages.

According to an aspect of the present invention, there is provided a connector assembly comprising of: a first connector comprising a first housing on which a first latch device is formed; and a second connector comprising a second housing on which a first snap slot and a padlock hole are formed. When the first connector and the second connector are assembled to a pre lock position, the first latch device is locked into the first snap slot and blocked by a padlock locked into the padlock hole to prevent the first connector and the second connector from being further assembled to a final lock position.

According to an exemplary embodiment of the present invention, a second latch device is formed on the first housing, and a blocking part is formed on the second housing; when the first connector and the second connector are assembled to the pre lock position, the second latch device is blocked by the blocking part to prevent the first connector and the second connector from being further assembled to the final lock position.

According to another exemplary embodiment of the present invention, a second latch slot is formed on the second housing; when the first connector and the second connector are assembled to the final lock position, the first latch device is locked into the second latch slot, and the second latch device is locked onto the blocking part; when the first latch device is moved to separate from the first latch slot and the second latch device is moved to not interfere with the blocking part, the first connector and the second connector are allowed to be further assembled from the pre lock position to the final lock position.

According to another exemplary embodiment of the present invention, the first latch device comprises a wing connected to a side of the first housing and a first latch connected to the wing, and the first latch is adapted to be locked into the first latch slot and the second latch slot respectively; the second housing has a first accommodation part adapted to receive the first latch device, and the first latch slot and the second latch are formed on a side wall of the first accommodation part.

According to another exemplary embodiment of the present invention, a limit part is formed on the first accommodation part, and the limit part is at least partially arranged around the first latch to prevent the first latch from being offset due to accidental force; the limit part comprises a pre lock limit part and an final lock limit part which are respectively arranged around the first latch at the pre lock position and the final lock position; the pre lock limit part protrudes outward relative to the final lock limit part along a radial direction of the second housing.

According to another exemplary embodiment of the present invention, the second latch device comprises a second latch, and both sides of the second latch are respectively connected to a top wall of the first housing by an elastic connecting part; the second latch comprises a locking part extending forward from the elastic connecting part; when the first connector and the second connector are assembled to the pre lock position, the front end of the locking part is blocked by the blocking part to prevent the first connector and the second connector from being further assembled to the final lock position.

According to another exemplary embodiment of the present invention, an opening is formed on the locking part, and the blocking part is adapted to be locked into the opening of the locking part; when the first connector and the second connector are assembled to the final lock position, the blocking part is locked into the opening of the locking part.

According to another exemplary embodiment of the present invention, the second latch also includes an unlocking part extending backward from the elastic connecting part, the locking part is capable of being moved to an unlocking position to separate from and not to interfere with the blocking part by pressing the unlocking part.

According to another exemplary embodiment of the present invention, the first connector further comprises a safety device, which is inserted into the second latch device to prevent the locking part from being moved to the unlocking position; the safety device includes an operation part and an insertion part extending backward from the operation part; when the first connector and the second connector are assembled to the final lock position, the insertion part of the safety device is inserted below the unlocking part to prevent the locking part from being moved to the unlocking position by pressing the unlocking part.

According to another exemplary embodiment of the present invention, the safety device also includes a cantilever part extending forward from the operation part; when the first connector and the second connector are assembled to the pre lock position, the cantilever part is locked into the opening of the locking part to prevent the insertion part of the safety device from being inserted below the unlocking part, so as to allow the locking part to be moved to the unlocking position by pressing the unlocking part; when the first connector and the second connector are assembled to the final lock position, the blocking part pushes the cantilever part of the safety device out of the opening of the locking part to allow the insertion part of the safety device to be inserted below the unlocking part.

According to another exemplary embodiment of the present invention, the first latch slot and the padlock hole on the second connector are located on the same radial side of the second housing.

According to another exemplary embodiment of the present invention, a protrusion is formed on the bottom of the first housing, and a blocking step is formed on the bottom of the second housing; when the first connector and the second connector are assembled to the pre lock position, the protrusion on the first housing is engaged with the blocking step on the second housing to prevent the first connector and the second connector from being separated from the pre lock position.

According to another exemplary embodiment of the present invention, the first connector also includes a first terminal provided in the first housing, and the second connector also includes a second terminal provided in the second housing; when the first connector and the second connector are assembled to the pre lock position, the first terminal and the second terminal are electrically separated from each other; when the first connector and the second connector are assembled to the final lock position, the first terminal and the second terminal electrically contact with each other.

According to another aspect of the present invention, there is provided a connector comprising: a housing; a first latch slot formed on the housing; and a padlock hole formed on the housing. When the connector and a mating connector are assembled to a pre lock position, a first latch device on the mating connector is locked into the first latch slot and blocked by a padlock locked into the padlock hole, to prevent the connector and the mating connector from being further assembled to the final lock position.

According to an exemplary embodiment of the present invention, a second latch slot is formed on the housing; when the connector and the mating connector are assembled to a final lock position, the first latch device is locked into the second latch slot.

In the foregoing exemplary embodiments according to the present invention, a padlock hole is formed on the second connector, so the insertion of the first connector to the final lock position can be prevented by a padlock locked into the padlock hole. Therefore, the present invention can reliably prevent the first connector and the second connector from being accidentally matched together and improve the safety.

In addition, in some of the foregoing exemplary embodiments according to the present invention, a blocking part for blocking the insertion of the first connector to the final lock position is provided on the second connector. Therefore, the present invention can reliably prevent the first connector and the second connector from being accidentally matched together and improve the safety.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
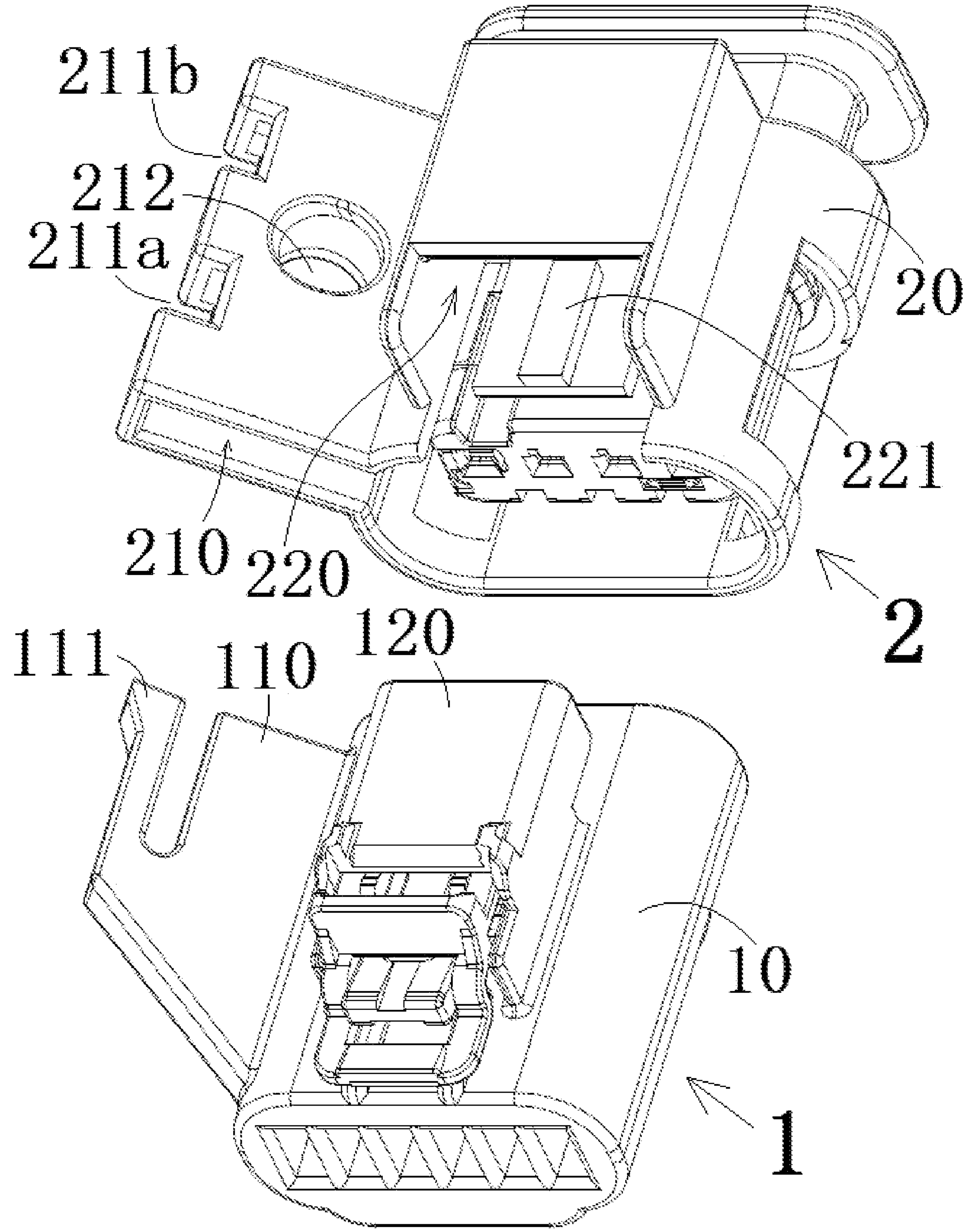
FIG. 1 shows an illustrative perspective view of a first connector and a second connector according to an exemplary embodiment of the present invention, wherein the first connector and the second connector are in a separated state.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a connector assembly comprising of: a first connector comprising a first housing on which a first latch device is formed; and a second connector comprising a second housing on which a first latch slot and a padlock hole are formed. When the first connector and the second connector are assembled to a pre lock position, the first latch device is locked into the first latch slot and blocked by a padlock locked into the padlock hole to prevent the first connector and the second connector from being further assembled to a final lock position.

According to another general concept of the present invention, there is provided a connector comprising of: a housing; a first latch slot formed on the housing; and a padlock hole formed on the housing. When the connector and a mating connector are assembled to a pre lock position, a first latch device on the mating connector is locked into the first latch slot and blocked by a padlock locked into the padlock hole, to prevent the connector and the mating connector from being further assembled to the final lock position.

FIG. 1 shows an illustrative perspective view of a first connector 1 and a second connector 2 according to an exemplary embodiment of the present invention, wherein the first connector 1 and the second connector 2 are in a separated state.

As shown in FIG. 1, in the illustrated embodiment, the connector assembly mainly includes a first connector 1 and a second connector 2. The first connector 1 includes a first housing 10 and a first latch device 110 and a second latch device 120. The first latch device 110 and the second latch device 120 are formed on the first housing 10. The second connector 2 includes a second housing 20, a first latch slot 211*a* and a raised blocking part 221. The first latch slot 211*a* and the raised blocking part 221 are formed on the second housing 20.

Figure 4:
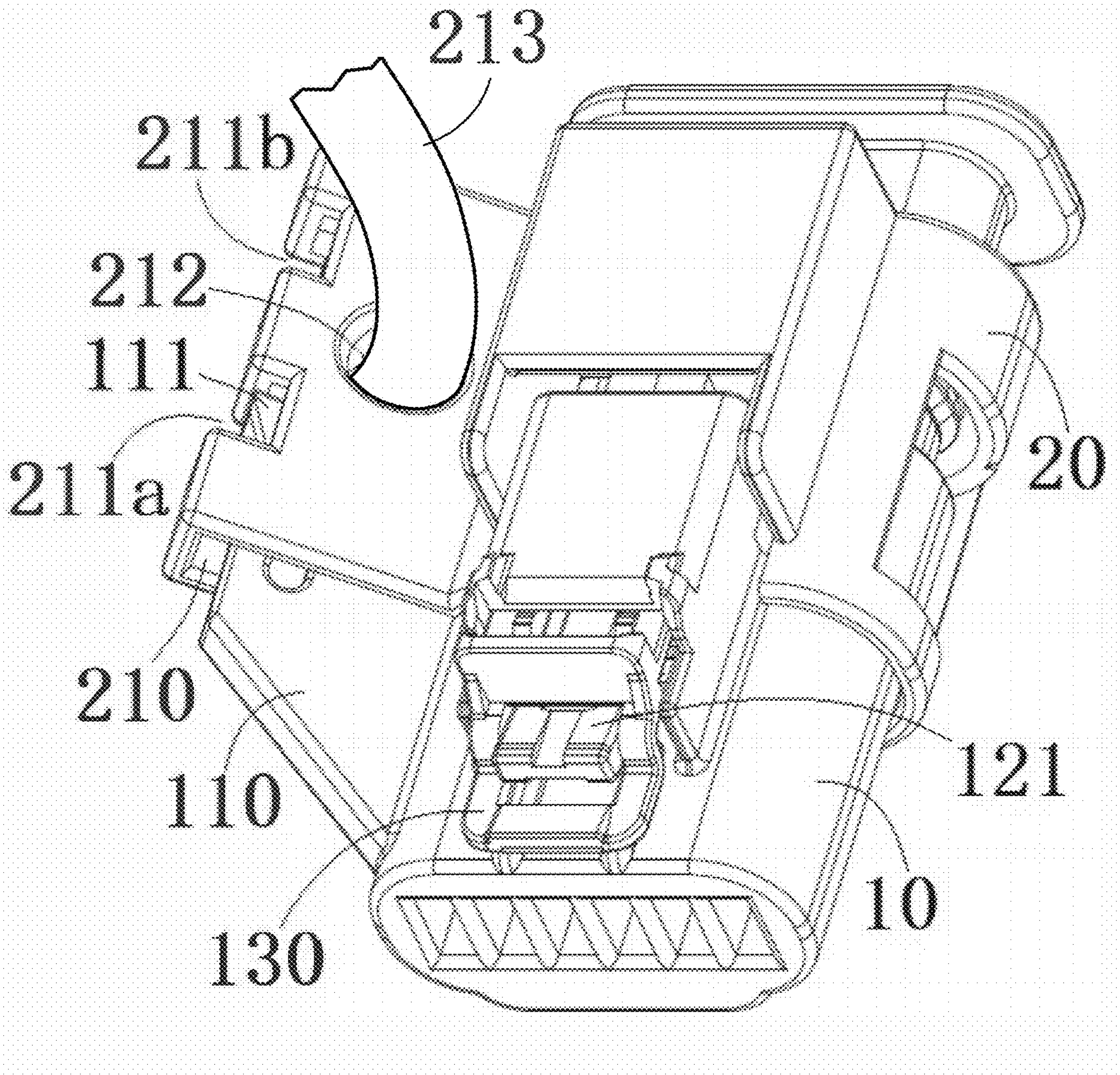
FIG. 4 shows an illustrative perspective view of a first connector and a second connector according to an exemplary embodiment of the present invention, wherein the first connector and the second connector are assembled to the pre lock position.
Figure 5:
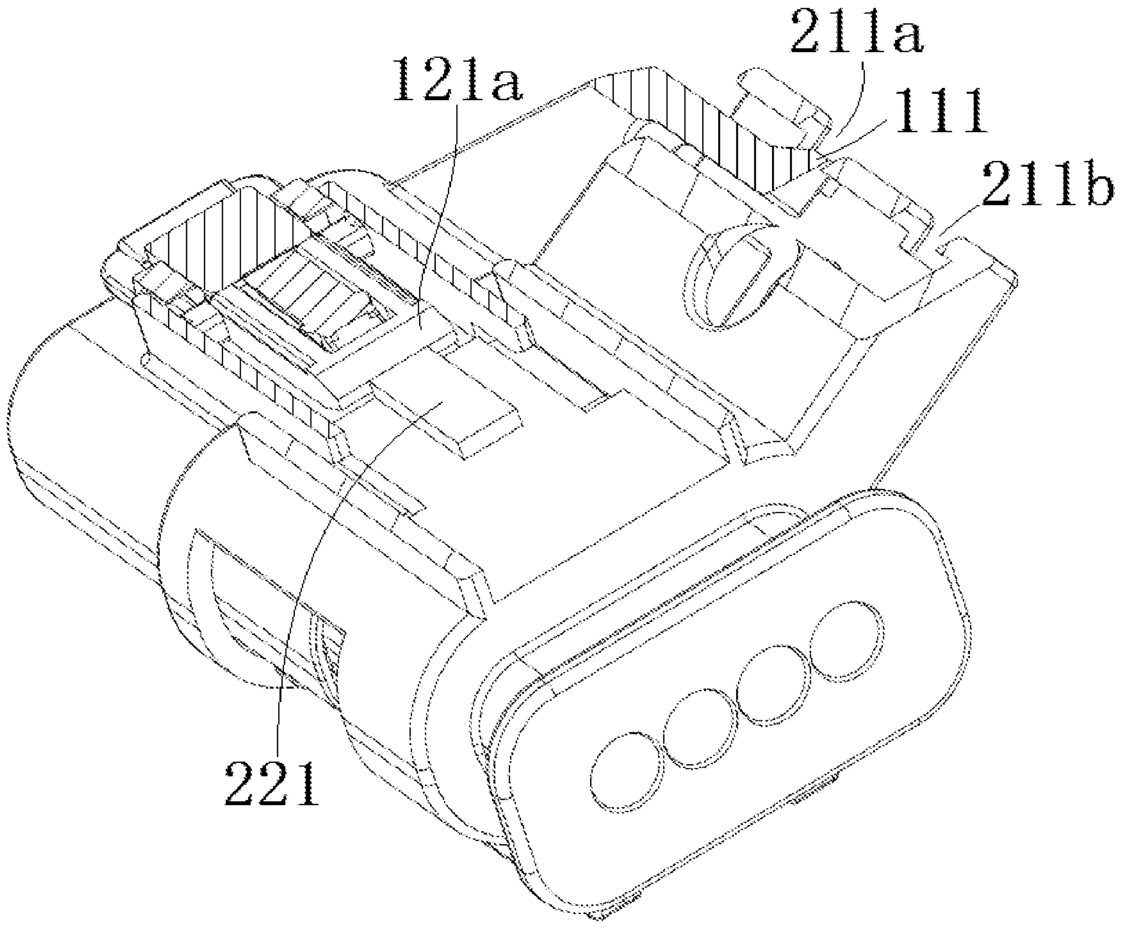
FIG. 5 shows a cross-sectional view of the first connector and the second connector in the pre locked position shown in FIG. 4.
Figure 6:
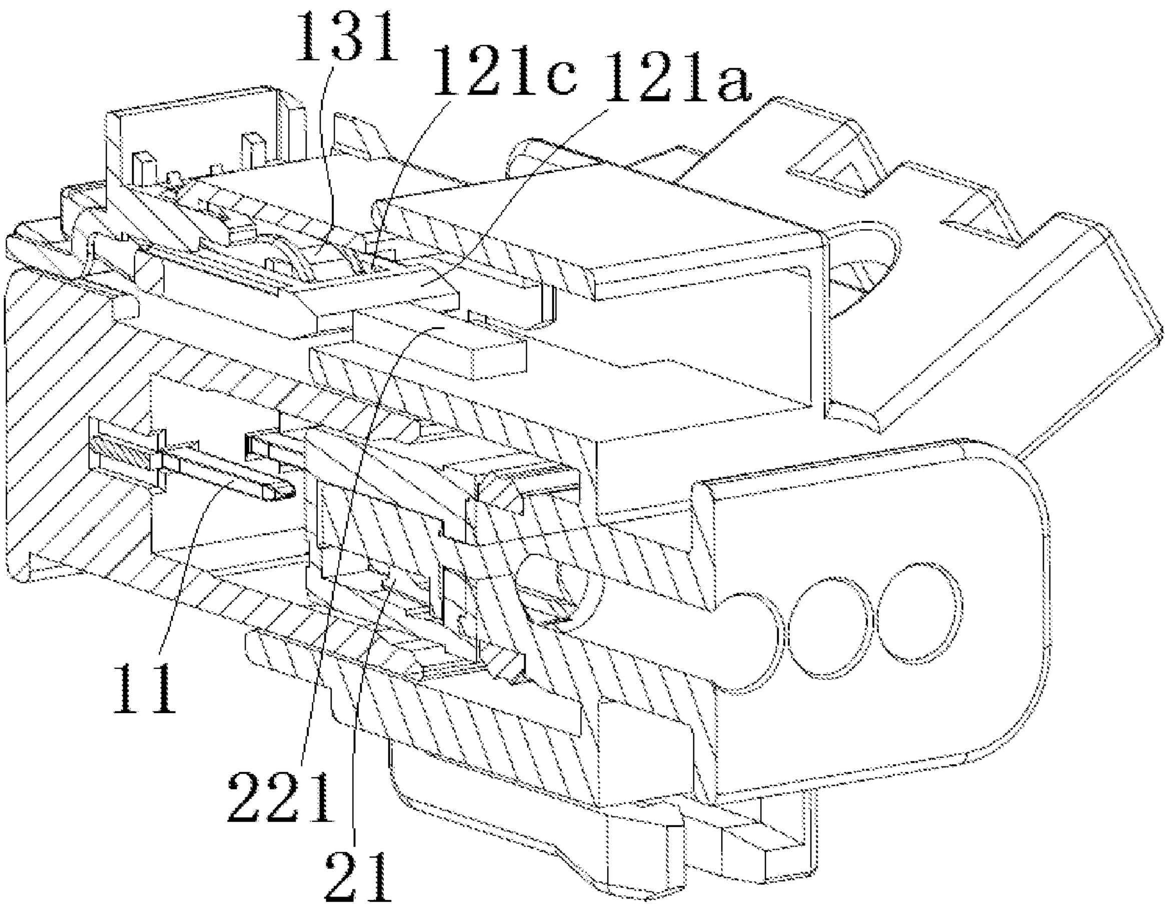
FIG. 6 shows a longitudinal sectional view of the first connector and the second connector in the pre locked position shown in FIG. 4.

FIG. 4 shows an illustrative perspective view of the first connector 1 and the second connector 2 according to an exemplary embodiment of the present invention, wherein the first connector 1 and the second connector 2 are assembled to the pre lock position; FIG. 5 shows a cross-sectional view of the first connector 1 and the second connector 2 in the pre locked position shown in FIG. 4; FIG. 6 shows a longitudinal sectional view of the first connector 1 and the second connector 2 in the pre locked position shown in FIG. 4.

As shown in FIGS. 1 and 4-6, in the illustrated embodiment, when the first connector 1 and the second connector 2 are assembled to the pre lock position, the first latch device 110 is locked into the first latch slot 211*a*, and the second latch device 120 is blocked by the raised blocking part 221 to prevent the first connector 1 and the second connector 2 from being further assembled to the final lock position.

Figure 8:
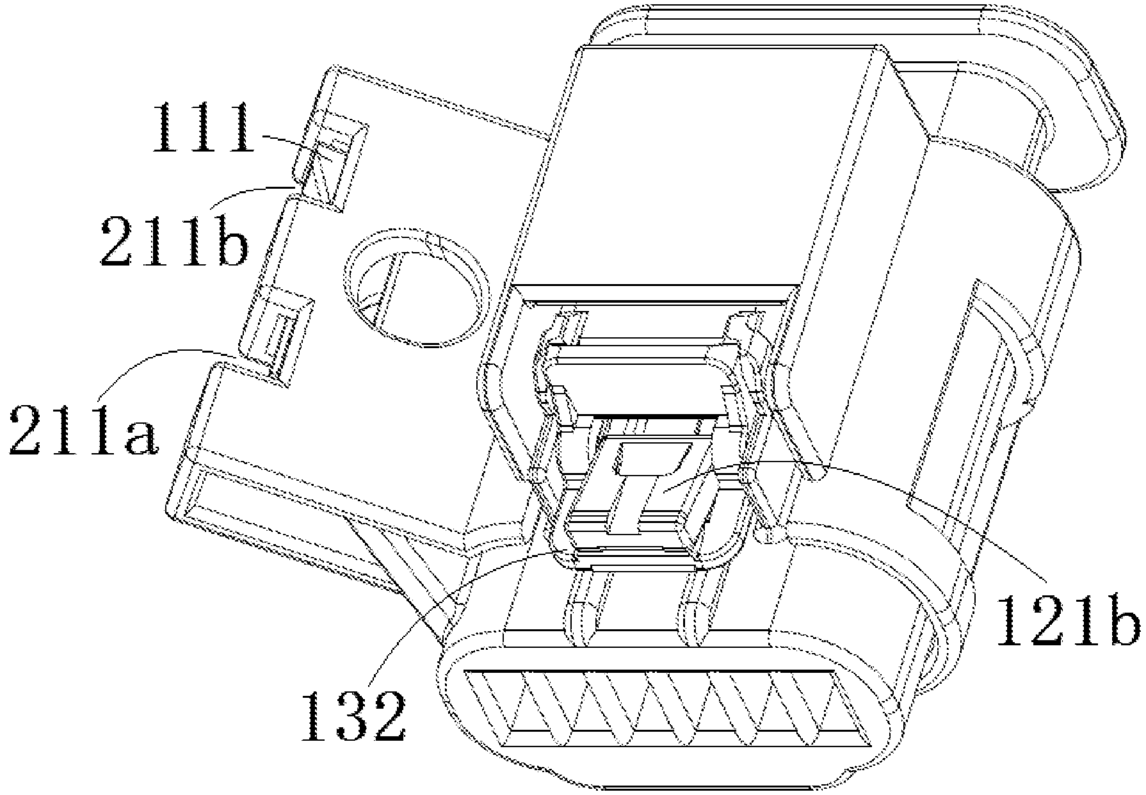
FIG. 8 shows an illustrative perspective view of a first connector and a second connector according to an exemplary embodiment of the present invention, wherein the first connector and the second connector are assembled to a final lock position.
Figure 9:
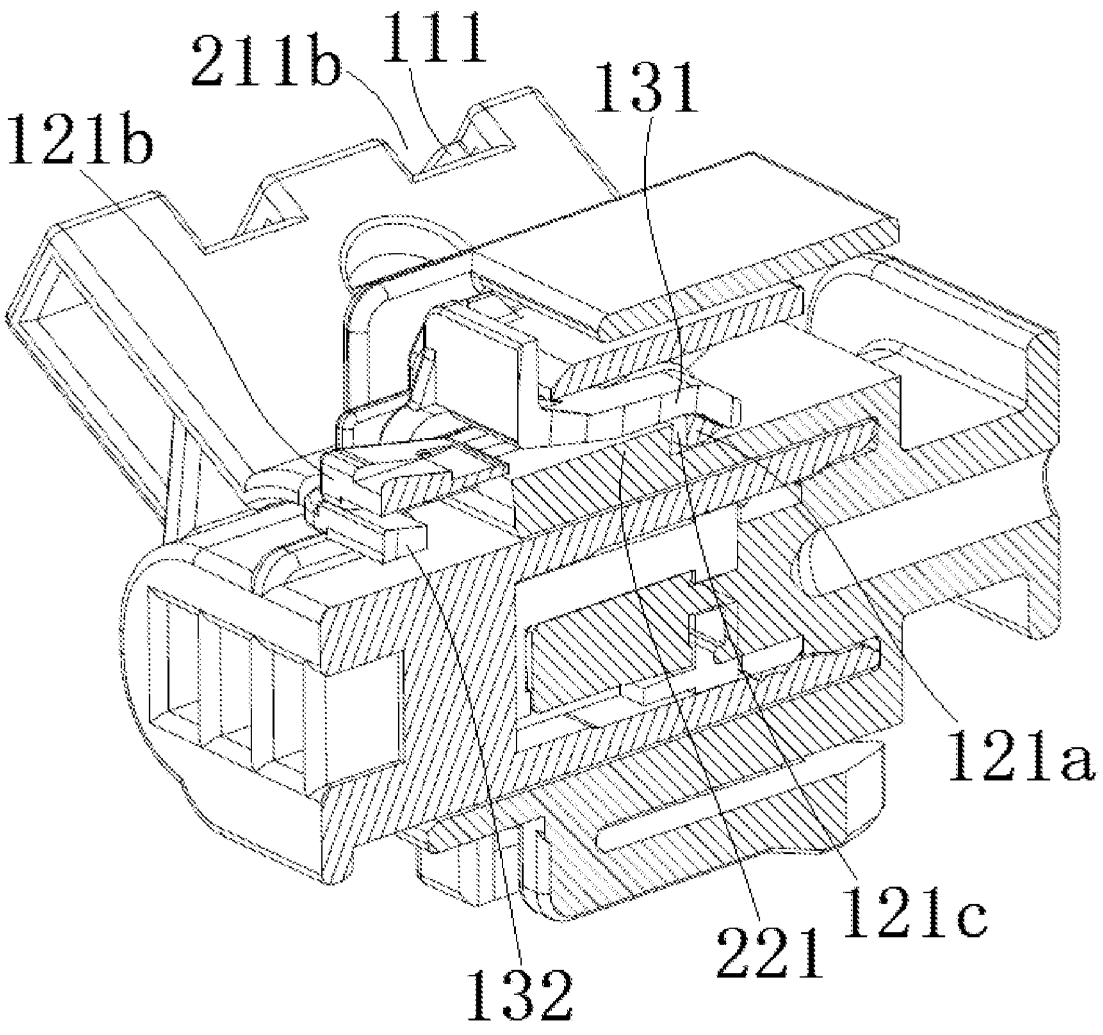
FIG. 9 shows a longitudinal sectional view of the first connector and the second connector in the final lock position shown in FIG. 8.

FIG. 8 shows an illustrative perspective view of the first connector 1 and the second connector 2 according to an exemplary embodiment of the present invention, wherein the first connector 1 and the second connector 2 are assembled to a final lock position; FIG. 9 shows a longitudinal sectional view of the first connector 1 and the second connector 2 in the final lock position shown in FIG. 8.

As shown in FIGS. 1 and 4-9, in the illustrated embodiment, a second latch slot 211*b* is also formed on the second housing 20. When the first connector 1 and the second connector 2 are assembled to the final lock position shown in FIGS. 8 and 9, the first latch device 110 is locked into the second latch slot 211*b*, and the second latch device 120 is locked onto the blocking part 221 to lock the first connector 1 and the second connector 2 in the final lock position.

As shown in FIGS. 4-6, in the illustrated embodiment, the first connector 1 and the second connector 2 can be further assembled from the pre lock position to the final lock position only when the first latch device 110 is moved separate from the first latch slot 211*a* and the second latch device 120 is moved to not interfere with the blocking part 221. Therefore, the present invention can reliably prevent the first connector 1 and the second connector 2 from being accidentally matched together and improve the safety.

Figure 7:
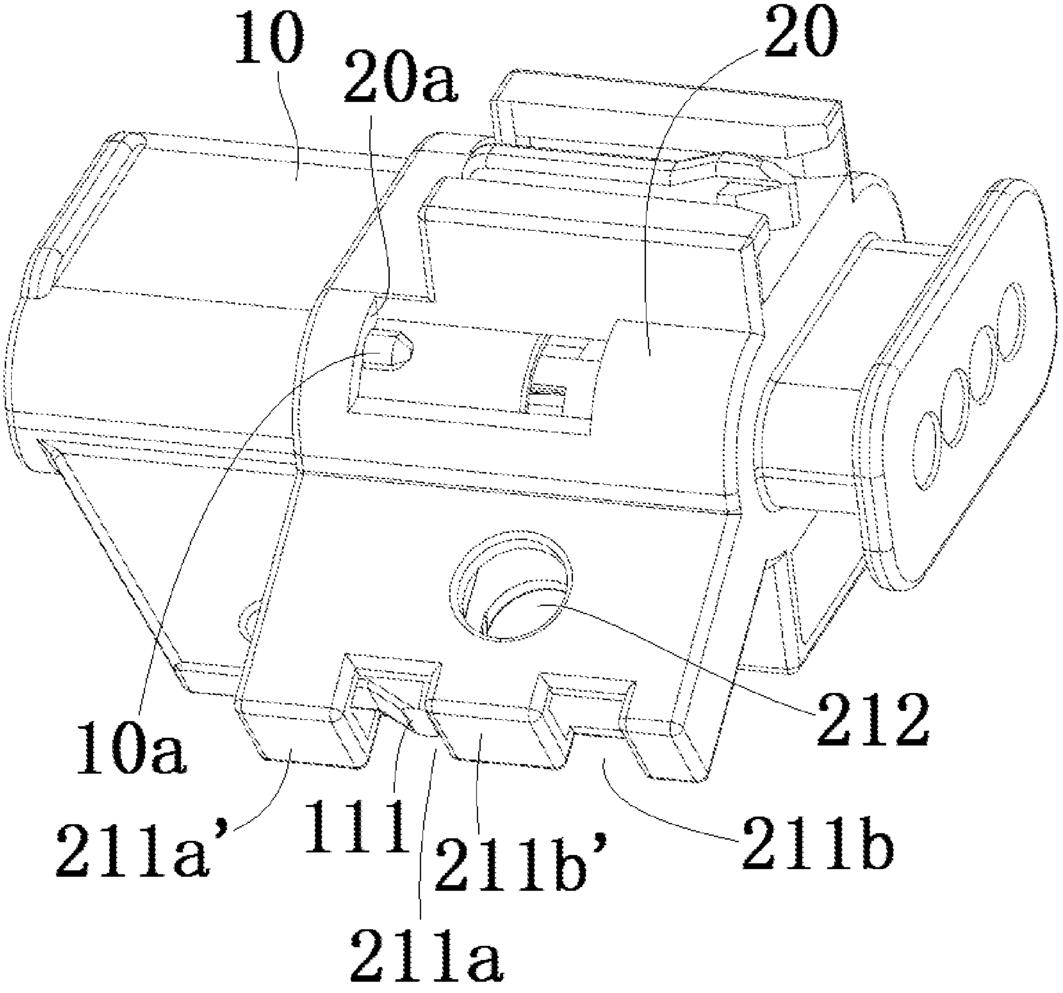
FIG. 7 shows an illustrative perspective view of the first connector and the second connector in the pre locked position shown in FIG. 4 when viewed from the bottom.

FIG. 7 shows an illustrative perspective view of the first connector 1 and the second connector 2 in the pre locked position shown in FIG. 4 when viewed from the bottom.

As shown in FIGS. 4 and 7, in the illustrated embodiment, a protrusion 10*a* is formed on the bottom of the first housing 10. An accommodation slot is formed on the bottom of the second housing 20, and a blocking step 20*a* is formed on a side of the accommodation slot. When the first connector 1 and the second connector 2 are assembled to the pre lock position, the protrusion 10*a* on the first housing 10 enters into the accommodation slot of the second housing 20 and is engaged with the blocking step 20*a* to prevent the first connector 1 and the second connector 2 from being separated from the pre lock position.

Figure 2:
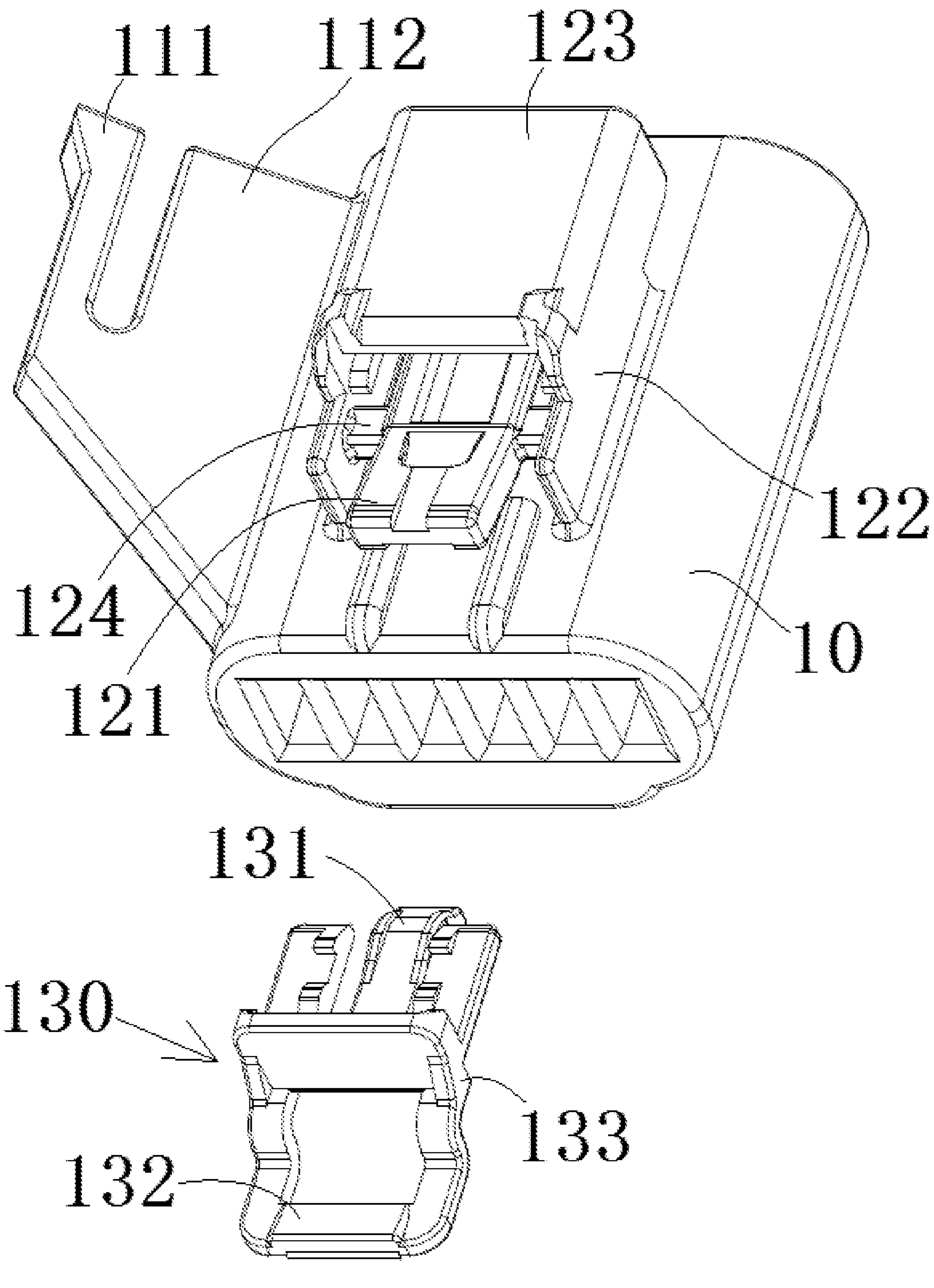
FIG. 2 shows an illustrative exploded view of the first connector shown in FIG. 1.
Figure 3:
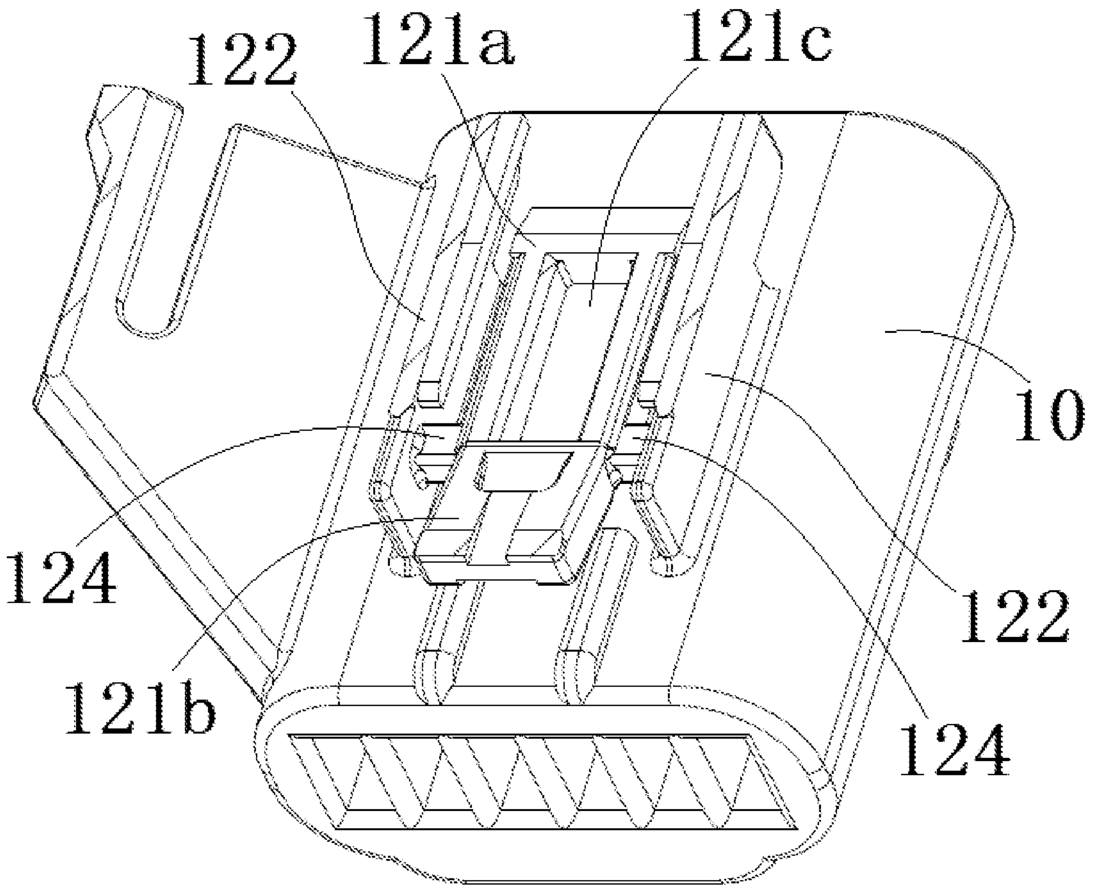
FIG. 3 shows a partial sectional view of the first connector shown in FIG. 2.

FIG. 2 shows an illustrative exploded view of the first connector 1 shown in FIG. 1; FIG. 3 shows a partial sectional view of the first connector 1 shown in FIG. 2.

As shown in FIGS. 1 to 9, in the illustrated embodiment, the first latch device 110 includes a wing 112 connected to the side of the first housing 10 and a first latch 111 connected to the wing 112. The first latch 111 is adapted to be locked into the first latch slot 211*a* and the second latch slot 211*b*, respectively. The second housing 20 has a first accommodation part 210 adapted to accommodate the inserted first latch device 110, and the first latch 211*a* and the second latch slot 211*b* are formed on the side wall of the first accommodation part 210.

As shown in FIGS. 4 and 7, in the illustrated embodiment, a pre lock limit part 211*a*' and a final lock limit part 211*b*' are also formed on the first accommodation part 210 of the second housing 20. The pre lock limit part 211*a*' and the final lock limit part 211*b*' are arranged at least partially around the first latch 111 in the pre lock position and the final lock position respectively to prevent the first latch 111 from being offset due to accidental force. The pre lock limit part 211*a*' protrudes outward relative to the final lock limit part 211*b*' along a radial direction of the second housing 20.

As shown in FIGS. 4 and 7, in the illustrated embodiment, when the first latch device 110 is locked into the first latch slot 211*a*, the first latch 111 is engaged with a wall surface (or referred to as a first step surface) of the first latch slot 211*a* to maintain the first connector 1 and the second connector 2 in the pre lock position and prevent the first connector 1 and the second connector 2 from being further assembled to the final lock position.

As shown in FIG. 8, in the illustrated embodiment, when the first latch device 110 is locked into the second latch slot 211*b*, the first latch 111 is engaged with a wall surface (or referred to as a second step surface) of the second latch slot 211*b* to maintain the first connector 1 and the second connector 2 in the final lock position.

As shown in FIGS. 1 to 9, in the illustrated embodiment, the second latch device 120 includes: a pair of support walls 122 connected to the top wall of the first housing 10; a second latch 121 connected between the pair of support walls 122; and a top wall 123 connected to the top of the pair of support walls 122. The second housing 20 has a second accommodation part 220 suitable for accommodating the inserted second latch device 120, the raised blocking part 221 is formed on the bottom wall of the second accommodation part 220, and the second latch 121 is suitable for locking the raised blocking part 221.

As shown in FIGS. 1 to 9, in the illustrated embodiment, both sides of the second latch 121 are respectively connected to the pair of support walls 122 by an elastic connecting part 124; The second latch 121 includes a locking part 121*a* extending forward from the elastic connecting portion 124. An opening 121*c* is formed on the locking part 121*a*, and the blocking part 221 is adapted to be locked into the opening 121 of the locking part 121*a*.

As shown in FIGS. 1 to 9, in the illustrated embodiment, the second latch 121 also includes an unlocking part 121*b* extending backward from the elastic connecting part 124, so that the locking part 121*a* can be moved to an unlocking position to separate from and not to interfere with the blocking part 221 by pressing the unlocking part 121*b*.

As shown in FIGS. 1 to 9, in the illustrated embodiment, when the first connector 1 and the second connector 2 are assembled to the pre lock position, the front end of the locking part 121*a* is blocked by the blocking part 221 to prevent the first connector 1 and the second connector 2 from being further assembled to the final lock position.

As shown in FIGS. 1 to 9, in the illustrated embodiment, when the first connector 1 and the second connector 2 are assembled to the final lock position, the blocking part 221 is locked into the opening 121*c* of the locking part 121*a* to lock the first connector 1 and the second connector 2 in the final lock position.

As shown in FIGS. 1 to 9, in the illustrated embodiment, the first connector 1 also includes a safety device 130, which is inserted into the second latch device 120 to prevent the locking part 121*a* from being moved to the unlocking position.

As shown in FIGS. 1 to 9, in the illustrated embodiment, the safety device 130 includes an operation part 133 and an insertion part 132 extending backward from the operation part 133. When the first connector 1 and the second connector 2 are assembled to the final lock position, the insertion part 132 of the safety device 130 is inserted below the unlocking part 121*b* to prevent the locking part 121*a* from being moved to the unlocking position by pressing the unlocking part 121*b*.

As shown in FIGS. 1 to 9, in the illustrated embodiment, the safety device 130 also includes a cantilever part 131 extending forward from the operation portion 133. When the first connector 1 and the second connector 2 are assembled to the pre lock position, the cantilever part 131 is locked into the opening 121*c* of the locking part 121*a* to prevent the insertion part 132 of the safety device 130 from being inserted below the unlocking part 121*b*, thereby allowing the locking part 121*a* to be moved to the unlocking position by pressing the unlocking part 121*b*.

As shown in FIGS. 1 to 9, in the illustrated embodiment, when the first connector 1 and the second connector 2 are assembled to the final lock position, the blocking part 221 pushes the cantilever part 131 of the safety device 130 out of the opening 121*c* of the locking part 121*a* to allow the insertion part 132 of the safety device 130 to be inserted below the unlocking part 121*b*.

As shown in FIGS. 1 to 9, in the illustrated embodiment, a padlock hole 212 is formed on the second housing 20, and the second connector 2 also includes a padlock 213 (FIG. 4) adapted to be locked into the padlock hole 212; When the padlock 213 is locked into the padlock hole 212, the padlock 213 can prevent the first connector 1 and the second connector 2 from being further assembled to the final lock position by blocking the first latch device 110.

As shown in FIGS. 1 to 9, in the illustrated embodiment, the first connector 1 also includes a first terminal 11 arranged in the first housing 10, and the second connector 2 also includes a second terminal 21 arranged in the second housing 20. When the first connector 1 and the second connector 2 are assembled to the pre lock position, the first terminal 11 and the second terminal 21 are electrically separated from each other. When the first connector 1 and the second connector 2 are assembled to the final lock position, the first terminal 11 and the second terminal 21 are electrically connected with each other.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector assembly, comprising:

a first connector comprising a first housing on which a first latch device is formed; and a second connector comprising a second housing on which a first latch slot and a padlock hole are formed, wherein when the first connector and the second connector are assembled to a pre lock position, the first latch device is locked into the first latch slot and blocked by a padlock locked into the padlock hole to prevent the first connector and the second connector from being further assembled to a final lock position.

2. The connector assembly according to claim 1, wherein a second latch device is formed on the first housing, and a blocking part is formed on the second housing, wherein when the first connector and the second connector are assembled to the pre lock position, the second latch device is blocked by the blocking part to prevent the first connector and the second connector from being further assembled to the final lock position.

3. The connector assembly according to claim 2, wherein a second latch slot is formed on the second housing;

wherein when the first connector and the second connector are assembled to the final lock position, the first latch device is locked into the second latch slot, and the second latch device is locked onto the blocking part;

wherein when the first latch device is moved to separate from the first latch slot and the second latch device is moved to not interfere with the blocking part, the first connector and the second connector are allowed to be further assembled from the pre lock position to the final lock position.

4. The connector assembly according to claim 3, wherein the first latch device comprises a wing connected to a side of the first housing and a first latch connected to the wing, and the first latch is adapted to be locked into the first latch slot and the second latch slot respectively;

wherein the second housing has a first accommodation part adapted to receive the first latch device, and the first latch slot and the second latch slot are formed on a side wall of the first accommodation part.

5. The connector assembly according to claim 4, wherein a limit part is formed on the first accommodation part, and the limit part is at least partially arranged around the first latch to prevent the first latch from being offset due to accidental force;

wherein the limit part comprises a pre lock limit part and an final lock limit part which are respectively arranged around the first latch at the pre lock position and the final lock position;

wherein the pre lock limit part protrudes outward relative to the final lock limit part along a radial direction of the second housing.

6. The connector assembly according to claim 3, wherein the second latch device comprises a second latch, and both sides of the second latch are respectively connected to a top wall of the first housing by an elastic connecting part;

wherein the second latch comprises a locking part extending forward from the elastic connecting part;

wherein when the first connector and the second connector are assembled to the pre lock position, the front end of the locking part is blocked by the blocking part to prevent the first connector and the second connector from being further assembled to the final lock position.

7. The connector assembly according to claim 6, wherein an opening is formed on the locking part, and the blocking part is adapted to be locked into the opening of the locking part;

wherein when the first connector and the second connector are assembled to the final lock position, the blocking part is locked into the opening of the locking part.

8. The connector assembly according to claim 6, wherein the second latch also includes an unlocking part extending backward from the elastic connecting part, the locking part is capable of being moved to an unlocking position to separate from and not to interfere with the blocking part by pressing the unlocking part.

9. The connector assembly according to claim 8, wherein the first connector further comprises a safety device, which is inserted into the second latch device to prevent the locking part from being moved to the unlocking position;

wherein the safety device includes an operation part and an insertion part extending backward from the operation part;

wherein when the first connector and the second connector are assembled to the final lock position, the insertion part of the safety device is inserted below the unlocking part to prevent the locking part from being moved to the unlocking position by pressing the unlocking part.

10. The connector assembly according to claim 9, wherein the safety device also includes a cantilever part extending forward from the operation part;

wherein when the first connector and the second connector are assembled to the pre lock position, the cantilever part is locked into the opening of the locking part to prevent the insertion part of the safety device from being inserted below the unlocking part, so as to allow the locking part to be moved to the unlocking position by pressing the unlocking part;

wherein when the first connector and the second connector are assembled to the final lock position, the blocking part pushes the cantilever part of the safety device out of the opening of the locking part to allow the insertion part of the safety device to be inserted below the unlocking part.

11. The connector assembly according to claim 1, wherein the first latch slot and the padlock hole on the second connector are located on the same radial side of the second housing.

12. The connector assembly according to claim 1, wherein a protrusion is formed on the bottom of the first housing, and a blocking step is formed on the bottom of the second housing;

wherein when the first connector and the second connector are assembled to the pre lock position, the protrusion on the first housing is engaged with the blocking step on the second housing to prevent the first connector and the second connector from being separated from the pre lock position.

13. The connector assembly according to claim 1, wherein the first connector also includes a first terminal provided in the first housing, and the second connector also includes a second terminal provided in the second housing;

wherein when the first connector and the second connector are assembled to the pre lock position, the first terminal and the second terminal are electrically separated from each other;

wherein when the first connector and the second connector are assembled to the final lock position, the first terminal and the second terminal electrically contact with each other.

14. A connector, comprising:

a housing;

a first latch slot formed on the housing; and a padlock hole formed on the housing, wherein when the connector and a mating connector are assembled to a pre lock position, a first latch device on the mating connector is locked into the first latch slot and blocked by a padlock locked into the padlock hole, to prevent the connector and the mating connector from being further assembled to the final lock position.

15. The connector according to claim 14, wherein a second latch slot is formed on the housing;

wherein when the connector and the mating connector are assembled to a final lock position, the first latch device is locked into the second latch slot.

* * * * *